(12) United States Patent  
Egan

(10) Patent No.: US 7,305,836 B2
(45) Date of Patent: Dec. 11, 2007

(54) CRYOGENIC CONTAINER AND SUPERCONDUCTIVITY MAGNETIC ENERGY STORAGE (SMES) SYSTEM

(75) Inventor: Gregory J. Egan, Littleton, CO (US)

(73) Assignee: Eden Innovations Ltd., Dublin (IE)

( * ) Notice: Subject to any disclaimer, the term of this patent is extended or adjusted under 35 U.S.C. 154(b) by 49 days.

(21) Appl. No.: 11/132,135

(22) Filed: May 18, 2005

(65) Prior Publication Data

US 2006/0068993 A1 Mar. 30, 2006

(30) Foreign Application Priority Data

May 19, 2004 (AU) .............................. 2004902677

(51) Int. Cl.
*F17C 3/08* (2006.01)
(52) U.S. Cl. .................. 62/45.1; 62/51.1; 62/50.6; 62/3.2; 62/3.6; 202/560.03; 202/560.04; 505/875; 505/898
(58) Field of Classification Search ............... 62/51.1, 62/45.1, 53.2, 3.2, 3.6, 50.6; 505/211, 163, 505/212, 213, 875, 898; 323/360; 220/560.1, 220/560.04, 560.03
See application file for complete search history.

(56) References Cited

U.S. PATENT DOCUMENTS

| 3,582,851 | A |   | 6/1971  | Meservey            |
|-----------|---|---|---------|---------------------|
| 3,930,375 | A | * | 1/1976  | Hofmann ...... 62/45.1 |
| 4,496,073 | A |   | 1/1985  | Silver et al.       |
| 4,848,103 | A | * | 7/1989  | Pelc et al. ...... 62/51.1 |
| 4,920,011 | A |   | 4/1990  | Ogawa et al.        |
| 5,061,685 | A |   | 10/1991 | Kosuge et al.       |
| 5,065,582 | A |   | 11/1991 | Seifert             |
| 5,081,071 | A |   | 1/1992  | Hirschkoff          |
| 5,146,383 | A |   | 9/1992  | Logan               |
| 5,359,149 | A |   | 10/1994 | Seike et al.        |
| 5,466,885 | A |   | 11/1995 | Irisawa             |

(Continued)

FOREIGN PATENT DOCUMENTS

EP 0 348 465 B1 8/1994

OTHER PUBLICATIONS

J. M. Tranquada et al., Quantum Magnetic Excitations from Stripes in Copper-Oxide Superconductors, Physics Dept., Brookhaven National Lab. Upton, NY, pp. 1-11, Apr. 2, 2004.
V. G. Kogan. "Meissner response of anisotropic superconductors". Ames Laboratory DOE and Physics Dept ISU, Ames, IA, pp. 1-7, date unknown.

(Continued)

*Primary Examiner*—Cheryl Tyler
*Assistant Examiner*—Emily Iris Nalven
(74) *Attorney, Agent, or Firm*—Stephen A. Gratton

(57) ABSTRACT

A cryogenic container includes an inner vessel for containing a cryogenic fluid, and an outer vessel for insulating the cryogenic fluid from the environment. The inner vessel includes a superconductive layer formed of a material having superconducting properties at the temperature of the cryogenic fluid. The superconductive layer forms a magnetic field around the cryogenic container, that repels electromagnetic energy, including thermal energy from the environment, keeping the cryogenic fluid at low temperatures. The cryogenic container has a portability and a volume that permits its' use in applications from handheld electronics to vehicles such as alternative fueled vehicles (AFVs). A SMES storage system includes the cryogenic container, and a SMES magnet suspended within the cryogenic fluid. The SMES storage system can also include a recharger and a cryocooler configured to recharge the cryogenic container with the cryogenic fluid.

10 Claims, 3 Drawing Sheets

U.S. PATENT DOCUMENTS

| | | | |
|---|---|---|---|
| 5,705,771 A | | 1/1998 | Flynn et al. |
| 5,804,760 A | | 9/1998 | Flynn |
| 5,956,957 A | * | 9/1999 | Lowry et al. ................ 62/51.1 |
| 6,058,713 A | | 5/2000 | Bowen et al. |
| 6,222,434 B1 | | 4/2001 | Nick |
| 6,486,393 B1 | | 11/2002 | Matsuba et al. |
| 6,521,077 B1 | | 2/2003 | McGivern et al. |
| 6,708,502 B1 | * | 3/2004 | Aceves et al. ............... 62/45.1 |
| 6,711,912 B2 | | 3/2004 | Laubacher et al. |
| 6,758,593 B1 | | 7/2004 | Terentiev |
| 6,797,341 B2 | * | 9/2004 | Zeng et al. ................ 427/585 |
| 6,834,508 B2 | | 12/2004 | Bradley et al. |

OTHER PUBLICATIONS

Paul C. Canfield and Sergey L. Bud'ko., "Low-Temperature Superconductivity is Warming Up", Scientific American, pp. 81-87, Apr. 2005.

M. J. Gouge et al. "Cryogenics Assessment Report", pp. 1-20, May 2002.

SMES: Superconducting Magnetic Energy Storage, brochure, author unknown, date unavailable, pp. 1-3.

Portable SMES coupled with Active Two-Stage (4K & 70K) Cryocooler, Institute for Superconducting and Electronic Material, University of Wollongong, Australia, pp. 1-6.

* cited by examiner

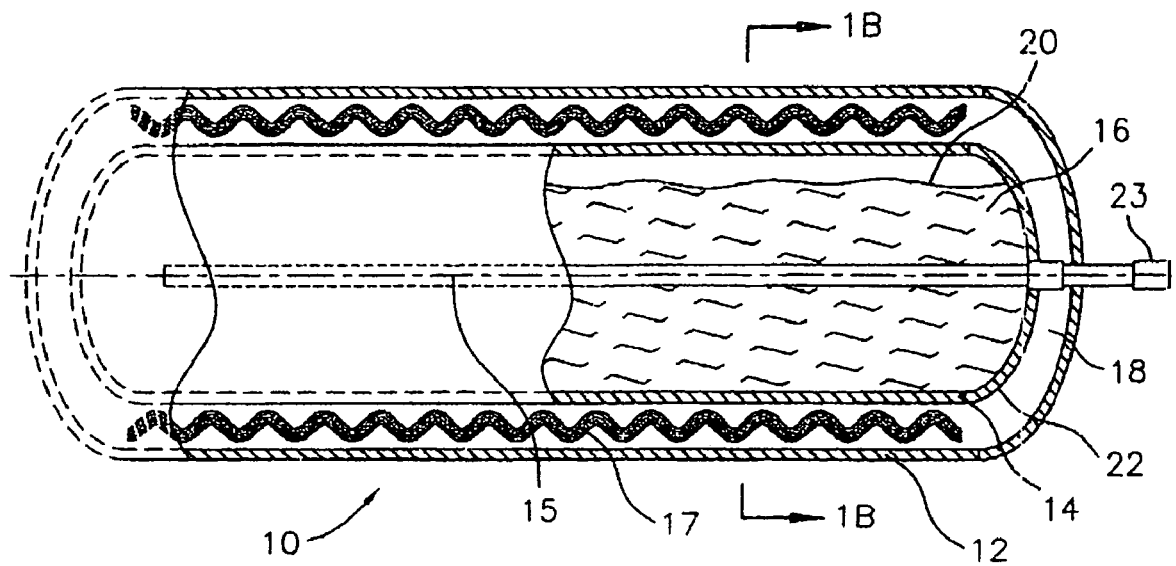
FIGURE 1A
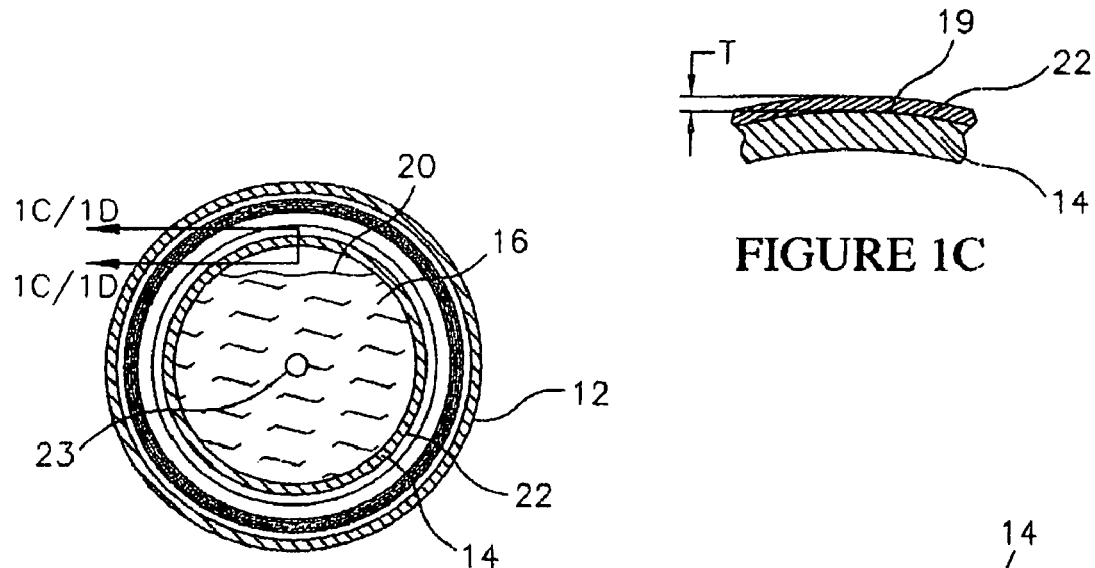
FIGURE 1B
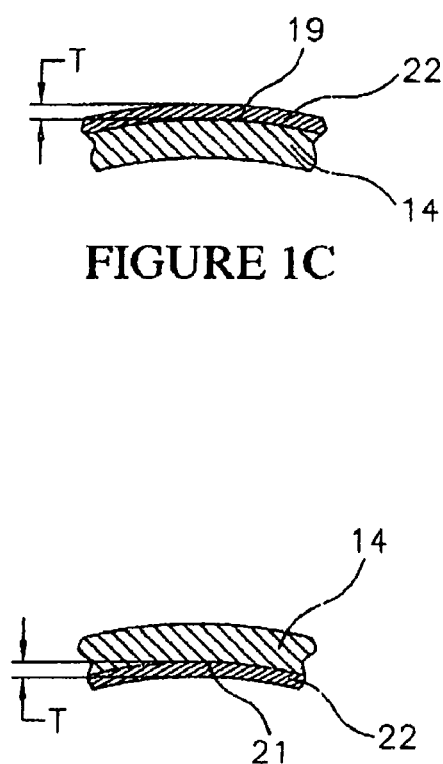
FIGURE 1C
FIGURE 1D

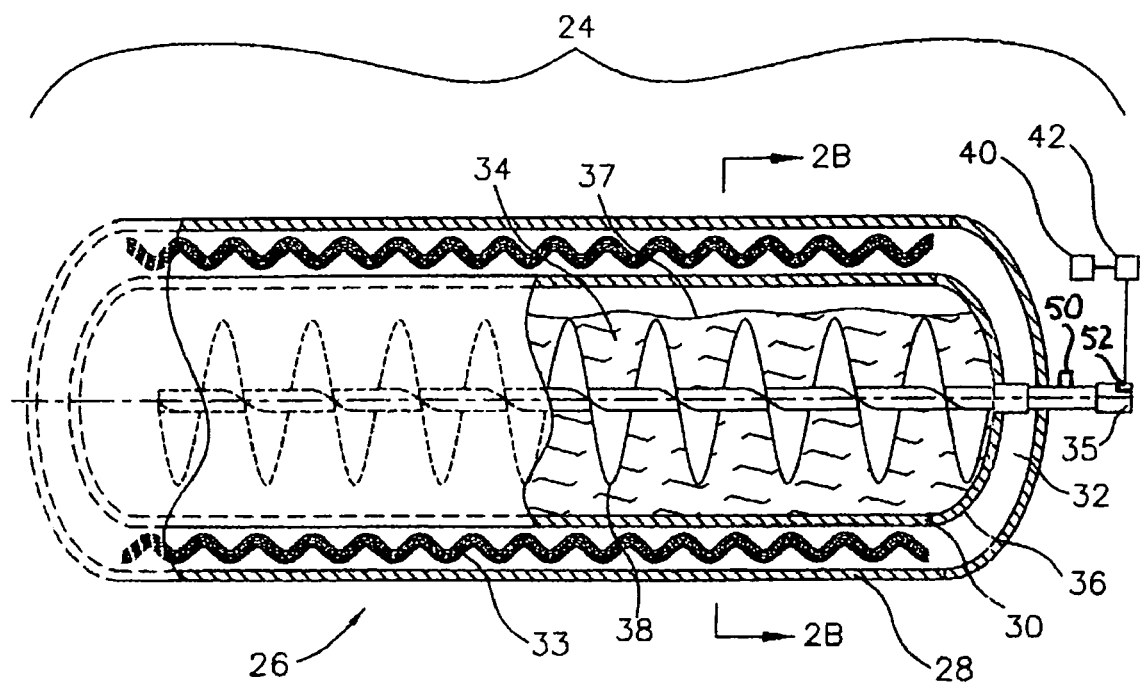
FIGURE 2A
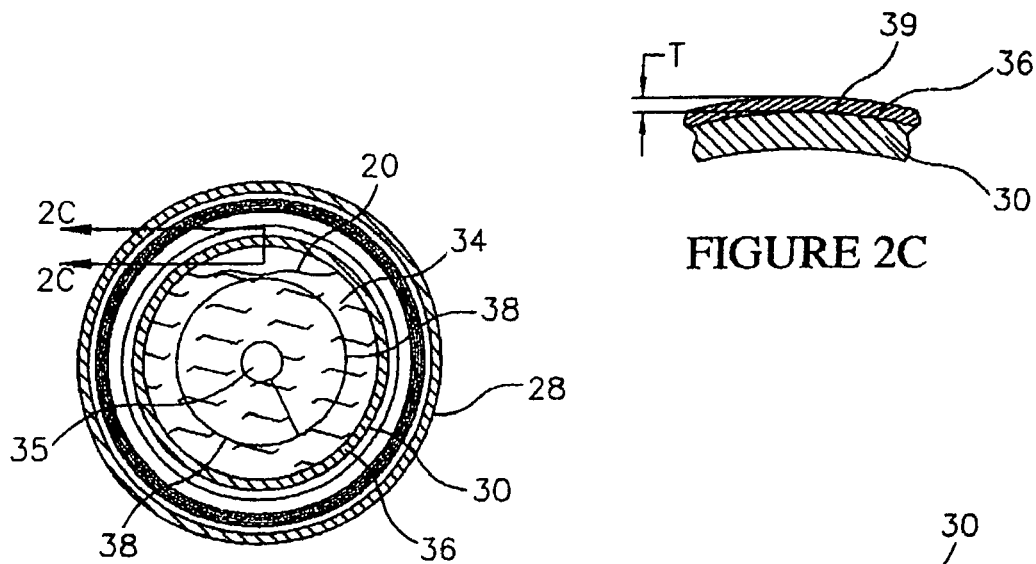
FIGURE 2C
FIGURE 2B
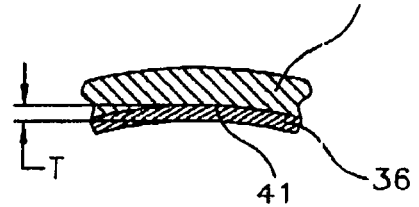
FIGURE 2D

| PROVIDING THE CRYOGENIC CONTAINER 10 ADAPTED TO CONTAIN THE CRYOGENIC FLUID 16 AT A SELECTED TEMPERATURE RANGE |
|---|
| PROVIDING THE SUPERCONDUCTING LAYER 22 ON THE CRYOGENIC CONTAINER 10 HAVING SUPERCONDUCTIVE PROPERTIES AT THE SELECTED TEMPERATURE RANGE |
| SHIELDING THE CRYOGENIC FLUID 16 FROM ELECTROMAGNETIC ENERGY USING THE SUPERCONDUCTING LAYER 22 |

CRYOGENIC CONTAINER AND SUPERCONDUCTIVITY MAGNETIC ENERGY STORAGE (SMES) SYSTEM

FIELD OF THE INVENTION

This invention relates generally to cryogenic containers for storing cryogenic fluids. This invention also relates to superconductivity magnetic energy storage (SMES) using cryogenic containers. This invention also relates to methods for shielding cryogenic fluids from thermal energy.

BACKGROUND OF THE INVENTION

Cryogenic containers, such as dewar type containers and cryogenic tanks, are used to store cryogenic fluids such as liquid nitrogen, oxygen, hydrogen and neon. A conventional cryogenic container includes an inner tank configured to contain the cryogenic fluid, and an outer tank configured to provide a thermal barrier between the cryogenic fluid and the environment. In addition, the outer tank forms an annulus around the inner tank in which insulation, and in some systems a vacuum, is contained. The outer tank and the annulus are constructed to minimize the conduction of thermal energy from the environment to the cryogenic fluid.

Cryogenic containers are commonly used by hospitals and in industrial applications where portability and compactness are not primary considerations. Cryogenic containers are also used in the transportation industry on ships and vehicles such as tank trucks and rail cars. In the transportation industry, portability and compactness are more of an issue, but in view of the scale of the vehicles, are not primary considerations.

Cryogenic containers are also used in alternative fueled vehicles (AFVs), such as cars and trucks, to store a cryogenic fluid for use as a combustion fuel for the vehicles. In this case, the cryogenic fluid can be in the form of liquid natural gas (LNG), compressed natural gas (CNG) or liquefied petroleum gas (LPG). The development of alternative fueled vehicles (AFVs) has been spurred by the Clean Air Act (1990) and the Energy Policy Act (1992). In addition, developing economies, such as China, have opted for polices which favor alternative fueled vehicles (AFVs) over conventional gas and diesel vehicles. With alternative fueled vehicles (AFVs), the portability and compactness of a cryogenic container can be a primary consideration. In addition, because the cryogenic liquids must be stored for periods of days or longer, these cryogenic containers must have a high thermal resistance from the environment to the cryogenic fluid.

Another technology that employs cryogenic containers is low temperature superconductivity. Superconductive materials have the ability to conduct electrical currents with no energy losses or resistive heating. In addition, superconductive materials exhibit magnetic properties that allow magnetic fields in excess of 20 tesla to be produced. Low temperature superconducting magnets are used in magnetic resonance imaging systems for medical applications, and in laboratories for experimental applications. In these applications, cryogenic containers are employed to maintain the low temperatures necessary for superconductivity.

Recently, superconductors, such as magnesium diboride ($MgB_2$), have been discovered which exhibit superconductivity at temperatures approaching 40 K. Although this is a low temperature, it can be achieved using technologies that are less expensive than those used to achieve superconductivity in conventional superconductors, such as niobium alloys, which require temperatures of about 23° K.

In addition to their use in magnetic resonance imaging systems, superconducting magnets can be used for storing electrical energy. This technology is known as superconducting magnetic energy storage (SMES). For example, U.S. Pat. No. 5,146,383 to Logan entitled "Modular Superconducting Magnetic Energy Storage Inductor", discloses a SMES system. U.S. Pat. No. 6,222,434 B1 to Nick entitled "Superconducting Toroidal Magnet System" also discloses a SMES system. In general, these prior art SMES systems are large non-portable, devices which are hundreds of feet in diameter. This technology, could be adapted to transportation and AFV industries, and to other applications as well, if the scale of the SMES system could be reduced.

The present invention is directed to all sizes of cryogenic containers, but particularly to a cryogenic container that is portable, yet has a low thermal conductivity, and a high thermal shielding capability. Further, the present invention is directed to a portable SMES system constructed using the cryogenic container. Still further, the present invention is directed to improved methods for shielding a cryogenic fluid from thermal energy.

SUMMARY OF THE INVENTION

In accordance with the present invention, an improved cryogenic container, a SMES system, and an improved method for shielding a cryogenic fluid are provided.

The cryogenic container includes an inner vessel configured to contain the cryogenic fluid at a selected temperature range. The cryogenic container also includes an outer vessel surrounding the inner vessel, and an annulus between the inner vessel and the outer vessel configured to contain an insulating material and/or a vacuum. The inner vessel includes a superconducting layer formed of a material having superconductive properties at the selected temperature range.

In the illustrative embodiment the inner vessel comprises a metal cylinder, and the superconducting layer covers either an inner surface (ID), or an outer surface (OD) of the inner vessel. Preferably, the superconducting layer comprises a low temperature superconductor material, such as magnesium diboride, a niobium alloy, a copper oxide or a BCS superconductor. The superconducting layer creates a magnetic field, which shields the cryogenic fluid from electromagnetic energy, reducing heat transfer from the environment, and maintaining the cryogenic fluid at low temperatures.

Heat transfer in the cryogenic container is affected by a number of factors, including, but not limited to, the infrared heating of the cold surfaces, conductive heat transfer by gas molecules from warm surfaces to cold surfaces, and conductive heat transfer through the support structure for the inner vessel. The magnetic field created by the superconducting layer reduces heat transfer due to infrared heating of the cold surfaces. The insulation in the annulus also reduces heat transfer from the environment to the cryogenic fluid.

The SMES system includes the cryogenic container and a SMES magnet in the inner vessel configured to store electrical energy. The SMES system also includes an electrical connector on the outer vessel configured for connection to an energy source for transferring electrical energy into the SMES magnet, or to a load for extracting stored electrical energy from the SMES magnet. The SMES system can also include a recharger and a cryocooler configured to recharge the cryogenic container with the cryogenic fluid.

The method includes the steps of: providing the cryogenic container adapted to contain the cryogenic fluid at the selected temperature range, providing the layer on the cryogenic container having superconductive properties at the selected temperature range, and shielding the cryogenic fluid from electromagnetic energy using the layer.

BRIEF DESCRIPTION OF THE DRAWINGS

FIG. 1A is a schematic cross sectional view of a cryogenic container constructed in accordance with the invention;

FIG. 1B is a schematic cross sectional view of the cryogenic container taken along section line 1B-1B of FIG. 1A;

FIG. 1C is an enlarged schematic cross sectional view taken along section line 1C-1C of FIG. 1B illustrating a superconductor layer on an inner wall of the cryogenic container;

FIG. 1D is an enlarged schematic cross sectional view taken along section line 1D-1D of FIG. 1B illustrating a superconductor layer on an outer wall of the cryogenic container;

FIG. 2A is a schematic cross sectional view of a SMES system constructed in accordance with the invention using the cryogenic container;

FIG. 2B is a schematic cross sectional view of the SMES system taken along section line 2B-2B of FIG. 2A;

FIG. 2C is an enlarged schematic cross sectional view taken along section line 2C-2C of FIG. 2B illustrating a superconductor layer on the SMES system;

FIG. 2D is an enlarged schematic cross sectional view taken along section line 2D-2D of FIG. 2B illustrating the superconductor layer on the SMES system

DETAILED DESCRIPTION OF THE PREFERRED EMBODIMENTS

Figures 3, 4:
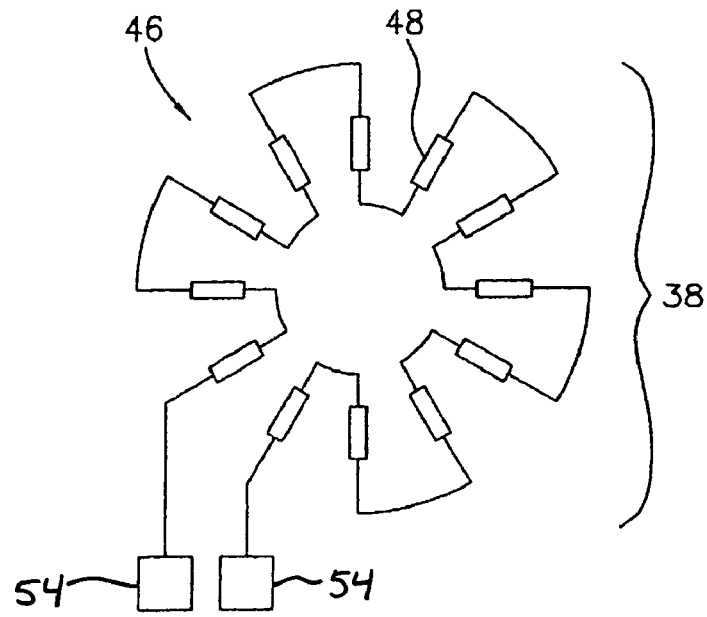
FIG. 3 is an electrical schematic of a SMES magnet of the SMES system.
FIG. 4 is a block diagram illustrating steps in the method of the invention.

Referring to FIGS. 1A-1D, a cryogenic container 10 constructed in accordance with the invention is illustrated. The cryogenic container 10 includes an outer vessel 12, and an inner vessel 14 suspended within the outer vessel 12. The outer vessel 12 and the inner vessel 14 and are generally cylindrically shaped, fluid tight tanks having internal volumes selected as required. Rather than being cylindrical, the outer vessel 12 and the inner vessel 14 can have other shapes, such as cylindrical.

Both the outer vessel 12 and the inner vessel 14 can comprise any material commonly used in the construction of Dewar-type cryogenic tanks, such as steel, stainless steel, or non magnetic stainless steel. In addition, the inner vessel 14 can be suspended within the outer vessel 12 using any conventional structure, such as support rods or rings (not shown).

Since size of the cryogenic container 10 is a key to portability, it is preferred that for portable applications, the cryogenic container 10 be from 1 centimeter to 1 meter in diameter, and 5 centimeter to 2 meters in length. However, these dimensions are not fixed and for non portable application can be increased to hundreds of feet. In addition, for portable applications, the cryogenic container 10 can be adapted to contain a volume of from 10 cc (cubic centimeters) to 1 $m^3$ (cubic meters) of a cryogenic fluid 16. In general, container sizes larger than this range adversely affect the portability of the cryogenic container 10, and its' use in transportation systems, particularly alternative fueled vehicles (AFVs). However, for non portable applications the contained volume can be greatly increased as the dimensions of the cryogenic container 10 are increased.

As shown in FIGS. 1A and 1B, the cryogenic fluid 16 is contained within the inner vessel 14. As used herein "cryogenic fluid" refers to fluid having a temperature of between 0.001 K and 200 K. Depending on the application, the cryogenic fluid 16 can comprise any fluid at cryogenic temperatures. By way of example, and not limitation, representative cryogenic fluids include nitrogen, oxygen, hydrogen, neon and compounds of these elements. In the illustrative embodiment, the cryogenic container 10 is oriented in a horizontal direction (i.e., parallel to the ground), such that the cryogenic fluid 16 has a fluid level 20 which is generally horizontal, and parallel to a longitudinal axis 15 of the cryogenic container 10. Alternately, the cryogenic container 10 can be vertically oriented, in which case the fluid level 20 would be generally orthogonal to the longitudinal axis 15.

The cryogenic container 10 also includes an annulus 18 between the outer vessel 12 and the inner vessel 14. The annulus 18 is adapted to contain a vacuum, and a multilayer thermal insulation 17, such as an Al/mylar and Dacron netting. The cryogenic container 10 also includes an interface tube 23, extending along the longitudinal axis 15 across nearly the entire length thereof. The interface tube 23 can include control devices, such as sensors, and a shut off valve, and safety devices, such as a pressure relief valve. The interface tube 23 can comprise a material having a high strength to thermal conductivity ratio, such as a fiberglass/epoxy composite. In addition, the interface tube 23 can include an external vacuum jacket (not shown).

The cryogenic container 10 also includes a superconducting layer 22, which comprises a material having superconductive properties at a temperature range corresponding to that of the cryogenic fluid 16. Preferably, the superconducting layer 22 comprises a low temperature superconductor where low temperature is defined as from 0.1 K to 150 K. Suitable low temperature superconductors include magnesium diboride, niobium alloys, and copper oxide alloys, such as rare earth copper oxide (RECuOx). Other suitable superconductors include carbon materials, ceramic materials and doped materials, such as magnesium diboride doped with silicon carbide (e.g., $MgB_2Si_x$). In general, the superconductive layer 22 can comprise any BCS superconductor, where BCS represents the initials of superconductor pioneers John Bardeen, Leon Cooper, and Robert Schrieffer. Further, the superconductive layer 22 can comprise multiple layers of material, such as different superconductors having different magnetic or electrical characteristics.

As shown in FIG. 1C, the superconducting layer 22 can cover an outside surface 19 (i.e., outside diameter—OD), of the inner vessel 14. Alternately, as shown in FIG. 1D, the superconducting layer 22 can cover an inside surface 21 (i.e., inside diameter—ID) of the inner vessel 14. As another alternative, the superconducting layer 22 can cover both the outside surface 19 and the inside surface 21 of the inner vessel 14.

The superconducting layer 22 can be formed on the inner vessel 14 using a suitable coating, deposition or laminating process such as chemical vapor deposition (CVD), mechanical alloying, or sintering. In addition, as previously stated, the superconducting layer 22 can comprise a single layer of material, or multiple stacked layers of material. A thickness T of the superconducting layer 22 can be selected as required, with from 0.1 µm to 1 meter being a representative range. Alternately, the superconductive layer 22 can comprise a separate element, such as a cover or a lining, that encompasses or lines the inner vessel 14 but is not permanently attached. In general, the superconductive layer 22 can comprise any mass of superconductor material configured to provide a shielding structure for any part of cryogenic fluid 20.

The superconducting layer 22 requires a low temperature in order to exhibit superconducting properties. For example, niobium-based alloys require a temperature of about 23 K to exhibit superconducting properties. Magnesium diboride requires a relatively warm temperature compared to other superconductors of 40 K. In the present case, these temperatures are achieved when the superconducting layer 22 is cooled by the cryogenic fluid 16.

For example, the cryogenic fluid 16 can be initially injected into the inner vessel 14 at a temperature of from 0.1 K to 150 K. This in turn will cool the superconducting layer 22 to substantially the same temperature. Once the superconducting layer 22 reaches its' critical temperature "Tc" and enters the superconducting state, a magnetic field will be created around the cryogenic container 10. This magnetic field will shield the cryogenic fluid 16 from electromagnetic energy, including thermal energy and infrared radiation, keeping the cryogenic fluid 10 at the desired low temperature. The superconducting layer 22 thus prevents heat from being transmitted via radiation from the environment through the inner vessel 14 to the cryogenic fluid 16.

It is theorized by the inventor that the magnetic field created by the superconducting layer 22 inhibits the incoming electromagnetic energy via either or both the Meissner effect, and/or pure diamagnetism. The strength of the magnetic field depends on the field strength, the current density and the coherence of the superconducting layer 22. It is also theorized that the repellent effect of the magnetic field created by the superconducting layer 22 mitigates the heating effects of the incoming short wave radiation. The thermal insulation 17, in addition to providing thermal insulation, also attenuates flux jumping and provides magnetic stability for the magnetic field created by the superconducting layer 22.

It is known that the superconducting state cannot exist in the presence of a magnetic field greater than a critical value. This critical magnetic field is strongly correlated with the critical temperature of the superconductor material. It is the nature of superconductors to exclude magnetic fields so long as the applied field does not exceed their critical magnetic field. This critical magnetic field can be tabulated at 0 K, and decreases from that magnitude as temperature increases, reaching zero at the critical temperature for superconductivity. The critical magnetic field at any temperature below the critical temperature is given by the relationship:

$$B_c \cong B_c(0)[1-(T/T_c)^2]$$

where T represents the current temperature of the material, $T_c$ represents the critical temperature of the material at which it which it loses its superconducting properties, and $B_c(0)$ represents the magnetic field of the material at 0 K.

The Meissner effect states that when a material makes the transition from a normal to a superconducting state, it actively excludes magnetic fields from its interior. This constraint to zero magnetic field inside a superconductor is distinct from the perfect diamagnetism which would arise from its zero electrical resistance. With zero resistance, it would be implied that if an attempt to magnetize a superconductor was made, current loops would be generated to exactly cancel the imposed field. However, if the material already had a steady magnetic field through it when it was cooled through the superconducting transition, the magnetic field would be expected to remain. If there were no change in the applied magnetic field, there would be no generated voltage to drive currents, even in a perfect conductor. Therefore, the active exclusion of magnetic field must be considered to be an effect distinct from zero resistance.

The superconducting layer 22 develops a magnetic field with frictionless current generation. The Meissner effect repels electromagnetic energy, including waves in the infrared region. The magnetic field enabled by the cryogenic temperature of the cryogenic fluid 16 can have a strength of up to 5 Telis. In addition, the energy requirement to maintain a current of 5 Telis is minimal because of the zero resistance nature of the superconductive field.

Referring to FIGS. 2A-2D, a SMES system 24 constructed in accordance with the invention is illustrated. The SMES system 24 includes a cryogenic container 26, which is substantially similar to the previously described cryogenic container 10 (FIG. 1A). The cryogenic container 26 includes an outer vessel 28, an inner vessel 30, an annulus 32, and thermal insulation 33, substantially as previously described for the outer vessel 12 (FIG. 1A), the inner vessel 14 (FIG. 1A), the annulus 18 (FIG. 1A), and the thermal insulation 17 (FIG. 1A). In addition, a cryogenic fluid 34 having a fluid level 37 is contained within the inner vessel 30, substantially as previously described for cryogenic fluid 16 (FIG. 1A) and fluid level 20 (FIG. 1A). The cryogenic container 26 also includes an interface tube 35, substantially as previously described for the interface tube 23 (FIG. 1A).

The cryogenic container 26 (FIG. 2A) also includes a superconducting layer 36 (FIGS. 2C-2D) formed on either an outside surface 29 (FIG. 2C) of the inner vessel 30 (FIG. 2C), or on an inside surface 41 (FIG. 2D) of the inner vessel 30 (FIG. 2D). The superconducting layer 36 (FIGS. 2C-2D) preferably comprises a low temperature superconductor material, substantially as previously described for superconducting layer 22 (FIG. 1C-1D).

The SMES system 24 (FIG. 2A) also includes a SMES magnet 38 (FIG. 2A) suspended within the inner vessel 30 (FIG. 2A) immersed in the cryogenic fluid 34 (FIG. 2A). The SMES magnet 38 (FIG. 2A) comprises a superconductive material coiled around the interface tube 35 (FIG. 2A). In addition, the SMES magnet 38 (FIG. 2A) includes an input/output electrical connector 50 (FIG. 2A) on the interface tube 35 (FIG. 2A) for transferring electrical energy into or out of the SMES magnet 38 (FIG. 2A).

The SMES system 24 (FIG. 2A) can also include a portable recharger 42 (FIG. 2A) configured to recharge the cryogenic container 26 (FIG. 2A) with the cryogenic fluid 24 (FIG. 2A). The recharger 42 (FIG. 2A) can be configured for removable sealed engagement with a fill port 52 (FIG. 2A) on the interface tube 35 (FIG. 2A). In addition, the recharger 42 (FIG. 2A) can include a compressor (not shown) configured to compress a cryogenic gas to a high pressure (e.g., 1000 to 3000 psig) for injection into the cryogenic container 26 (FIG. 2A) to form the cryogenic fluid 34 (FIG. 2A). The recharger 42 (FIG. 2A) can also include a passive cooling element such as a cold finger (not shown) to facilitate transfer of the pressurized cryogenic gas into the fill port 52 (FIG. 2A) on the interface tube 35 (FIG. 2A).

The SMES system 24 (FIG. 2A) can also include an active portable cryocooler 40 (FIG. 2A) configured to cool a fluid to a cryogenic temperature, and to transfer the fluid 34 to the recharger 42 (FIG. 2A). The cryocooler 40 (FIG. 2A) can also include a power supply (not shown), such as a 12 volt DC battery, for supplying energy for cooling the fluid. In addition, the cryocooler 40 (FIG. 2A) can include a heat exchanger (not shown) and a Joule-Thompson expansion valve (not shown) for cooling the fluid, and a fitting for removably coupling the cryocooler 40 (FIG. 2A) to the recharger 42 (FIG. 2A).

The SMES system 24 (FIG. 2A) can be used in any application requiring portable energy from handheld electronics to supply energy for vehicles. For example, the SMES system 24 (FIG. 2A) can be used as a power source for a alternative fueled vehicle (AFV). In this case, the cryogenic fluid 34 (FIG. 2A) can comprise liquid hydrogen, the cryocooler 40 (FIG. 2A) can be adapted to form supercritical hydrogen, and the recharger 42 (FIG. 2A) can be adapted to form compressed hydrogen gas. By way of example and not limitation, the SMES system 24 (FIG. 2A) can be configured to provide a SMES current of about 1000 A, a stored energy of about 2.1 MJ (amp hrs), an average power of about 200 kW, a carry over time of >8 seconds, a DC link voltage of up to 800 V, a magnetic field of 4.5 T, an inductivity of 4.1 H, and a magnet diameter of 760 mm/600 mm.

As shown in FIG. 3, the SMES magnet 38 includes a plurality of superconducting accumulator coils 46. Each accumulator coil 46 includes a plurality of coil segments 48 joined together and electrically connected to form the accumulator coil 46. In addition, each accumulator coil can comprise wires or layers formed of a superconductor material. One superconducting wire material comprises SiC doped $MgB_2$. This material has been used to develop superconducting magnets by the Institute for Superconducting and Electronic Materials, University of Wollongong, Wollongong, NSW 2522 Australia.

As also shown in FIG. 3, the SMES magnet 38 can include control circuitry 54 configured to either extract energy from the SMES magnet 38, or input energy into the SMES magnet 38. For example, in a charging mode the control circuitry 54 allows the SMES magnet to store energy, and in a discharge mode the control circuitry 54 allows the SMES magnet 38 to discharge energy.

The SMES system 24 (FIG. 2A) can also include additional sensors and circuitry on various elements of the cryogenic container 26 and within the interface tube 35. For example, additional sensors and circuitry (e.g., watt meter) can be used for measuring current and voltage input or output. Additional sensors and circuitry can also be used to measure heat transfer (i.e., MLI contact resistance, support structure conduction, free molecular gaseous conduction) with and without superconductivity, with temperature sensors placed in the insulation 33 and on various other surfaces. In addition, sensors and circuitry can be used to take boil off measurements of the cryogenic fluid 34. Although the sensors and circuitry would generate additional thermal energy, the system 24 can be configured to dissipate and mitigate the affects of this additional thermal energy.

Referring to FIG. 4, broad steps in the method of the invention are illustrated. These steps include providing the cryogenic container 10 adapted to contain the cryogenic fluid 16 at a selected temperature range; providing the superconducting layer 22 on the cryogenic container 10 having superconductive properties at the selected temperature range; and shielding the cryogenic fluid from electromagnetic energy using the superconducting layer 22.

Thus the invention provides a cryogenic container, a SMES system and a method for shielding a cryogenic fluid. While the invention has been described with reference to certain preferred embodiments, as will be apparent to those skilled in the art, certain changes and modifications can be made without departing from the scope of the invention as defined by the following claims.

What is claimed is:

1. A cryogenic container comprising:
an inner vessel configured to contain a cryogenic fluid at a selected temperature range;
an outer vessel surrounding the inner vessel;
a material lining a surface of the inner vessel having superconducting properties at the selected temperature range configured to shield the cryogenic fluid in the inner vessel from thermal energy transmitted through the inner vessel;
a recharger configured to inject a compressed cryogenic gas into the inner vessel for recharging the cryogenic fluid; and
a cryocooler configured to supply the recharger with a supercritical fluid.

2. A cryogenic container comprising:
an inner vessel configured to contain a cryogenic fluid at a selected temperature range;
an outer vessel surrounding the inner vessel; and
a superconductor material lining a surface of the inner vessel having superconducting properties at the selected temperature range configured to shield the cryogenic fluid in the inner vessel from thermal energy transmitted through the inner vessel;
wherein the material is not permanently attached to the inner vessel.

3. A system for storing electrical energy comprising:
an inner vessel configured to contain a cryogenic fluid at a selected temperature range;
an outer vessel surrounding the inner vessel forming an annulus between the inner vessel and the outer vessel;
a material on the inner vessel having superconducting properties at the selected temperature range;
a superconducting magnetic energy storage (SMES) magnet in the inner vessel configured to store the electrical energy;
a recharger configured to inject a compressed cryogenic gas into the inner vessel for recharging the cryogenic fluid; and
a cryocooler configured to supply the recharger with a supercritical fluid.

4. The system of claim 3 wherein the material comprises a layer substantially covering an outer surface of the inner vessel.

5. The system of claim 3 wherein the inner vessel is configured to contain a volume of from 10 cc (cubic centimeters) to 1 $m^3$ (cubic meters) of the cryogenic fluid.

6. The system of claim 3 wherein the annulus contains a thermal insulating material and a vacuum.

7. The system of claim 3 wherein the material comprises magnesium diboride.

8. The system of claim 3 wherein the material comprises a compound selected from the group consisting of magnesium diboride, a niobium alloy, a copper oxide, a BCS superconductor, a rare earth copper oxide (RECuOx), a carbon material, or a ceramic material.

9. A system for storing electrical energy comprising:
an inner vessel configured to contain a cryogenic fluid at a selected temperature range;
an outer vessel surrounding the inner vessel forming an annulus between the inner vessel and the outer vessel;
a material on the inner vessel having superconducting properties at the selected temperature range; and a superconducting magnetic energy storage (SMES) magnet in the inner vessel configured to store the electrical energy, the superconducting magnetic energy storage (SMES) magnet comprising at least one accumulator coil comprising doped silicon diboride.

10. The system of claim 9 wherein the inner vessel is configured to contain a volume of from 10 cc (cubic centimeters) to 1 $m^3$ (cubic meters) of the cryogenic fluid.

* * * * *